US 11,470,285 B2

(12) United States Patent
Westmacott et al.

(10) Patent No.: US 11,470,285 B2
(45) Date of Patent: Oct. 11, 2022

(54) METHOD AND SYSTEM FOR MONITORING PORTAL TO DETECT ENTRY AND EXIT

(75) Inventors: Ian Westmacott, Wakefield, MA (US); Christopher J. Buehler, Cambridge, MA (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 1275 days.

(21) Appl. No.: 13/367,770

(22) Filed: Feb. 7, 2012

(65) Prior Publication Data

US 2013/0201338 A1 Aug. 8, 2013

(51) Int. Cl.
*H04N 7/18* (2006.01)
*G08B 13/196* (2006.01)

(52) U.S. Cl.
CPC ....... *H04N 7/188* (2013.01); *G08B 13/19602* (2013.01)

(58) Field of Classification Search
None
See application file for complete search history.

(56) References Cited

U.S. PATENT DOCUMENTS

| | | | |
|---|---|---|---|
| 5,969,755 A | 10/1999 | Courtney | |
| 6,625,310 B2 | 9/2003 | Lipton et al. | |
| 6,696,945 B1 * | 2/2004 | Venetianer et al. | 340/541 |
| 6,970,083 B2 | 11/2005 | Venetianer et al. | |
| 7,088,846 B2 | 8/2006 | Han et al. | |
| 7,127,083 B2 | 10/2006 | Han et al. | |
| 7,148,912 B2 | 12/2006 | Han et al. | |
| 7,224,852 B2 | 5/2007 | Lipton et al. | |
| 7,280,673 B2 | 10/2007 | Buehler et al. | |
| 7,424,175 B2 | 9/2008 | Lipton et al. | |
| 7,499,571 B1 | 3/2009 | Han et al. | |
| 7,613,324 B2 | 11/2009 | Venetianer et al. | |
| 7,646,401 B2 | 1/2010 | Lipton et al. | |
| 2002/0070859 A1 | 6/2002 | Gutta et al. | |
| 2005/0104959 A1 | 5/2005 | Han et al. | |
| 2005/0265582 A1 * | 12/2005 | Buehler et al. | 382/103 |
| 2009/0060278 A1 | 3/2009 | Hassan-Shafique et al. | |

(Continued)

OTHER PUBLICATIONS

International Search Report and Written Opinion of the International Searching Authority dated Apr. 24, 2013 from counterpart International Application No. PCT/US2013/021742, filed on Jan. 16, 2013.

(Continued)

*Primary Examiner* — Mehrdad Dastouri
*Assistant Examiner* — Samuel D Fereja
(74) *Attorney, Agent, or Firm* — ArentFox Schiff LLP

(57) ABSTRACT

A video monitoring and analysis system detect subjects when they are entering and/or exiting from a room. The system enables a user to define a portal, such as doorway of the room. The system then monitors the movement of foreground objects in the room. Objects that appear only in the portal are classified as passing by the portal, e.g., doorway. Objects that initially appear in the portal and then are detected moving within the room are classified as having entered the room. Objects that are in the room and then disappear within the portal are classified as having exited the room. The system further has provisions for generating real-time alerts and performing forensic searches.

17 Claims, 9 Drawing Sheets

(56) References Cited

U.S. PATENT DOCUMENTS

| | | | |
|---|---|---|---|
| 2009/0244281 A1* | 10/2009 | Hiromasa | 348/143 |
| 2010/0026802 A1* | 2/2010 | Titus et al. | 348/143 |
| 2010/0238286 A1* | 9/2010 | Boghossian et al. | 348/143 |
| 2011/0044537 A1* | 2/2011 | Cobb | G06K 9/00771 |
| | | | 382/165 |
| 2011/0052003 A1* | 3/2011 | Cobb et al. | 382/103 |
| 2011/0150282 A1* | 6/2011 | Gupta | 382/103 |
| 2013/0038737 A1* | 2/2013 | Yehezkel et al. | 348/159 |

OTHER PUBLICATIONS

International Preliminary Report on Patentability dated May 16, 2014 from counterpart International Application No. PCT/US2013/021742, filed on Jan. 16, 2013.

European Examination Report Communication Pursuant to Article 94(3) EPC, dated Jun. 22, 2017, from European Patent Application No. 13 701 698.6, International Filing Date Jan. 16, 2013. Five pages.

* cited by examiner

METHOD AND SYSTEM FOR MONITORING PORTAL TO DETECT ENTRY AND EXIT

BACKGROUND OF THE INVENTION

Video systems used for surveillance are becoming increasingly common. They can be used to monitor buildings and rooms within buildings. The video systems can also be used monitor public areas such as parks or public spaces in and around buildings. In some cases they are used to catch illegal activity. In other cases, they are used to monitor usage such as shopping patterns in a retail store or traffic levels on public roadways, or detect events that would require the intervention of emergency response personnel.

One trend is to offer increasing levels of analytical capabilities. These analytical capabilities are helpful in a number of ways. They can be employed to reduce the number of operators required to monitor the video feeds from the separate cameras of the video systems by automatically notifying operators when events occur that require some action. For example, they can notify operators when individuals are entering a secure area or when potentially illegal activities are taking place, in real time. On the other hand, the video systems can further store metadata with the video data generated by the cameras so that operators can later search through the mountains of video data for events of interest in the archived video data. Examples of events of interest can include individuals entering a secure entryway or the theft of equipment or goods. Other uses are monitoring buildings and rooms within buildings to enable energy savings when building spaces are not being utilized.

Current video analytic systems have the capability to track people and other objects such as cars within scenes over time. One type of metadata that would be helpful for operators is knowing when individuals enter certain parts of a scene. A number of solutions have been proposed to provide such metadata by utilizing the notion of a virtual tripwire. Individuals in the video feed are monitored to determine whether they have crossed the tripwire or not. Specific crossing times are noted, along with direction of travel.

The specific technique for determining whether or not tripwires have been crossed relies on an assumption that the tripwires that are created on the screen are assumed to be at ground level in the displayed two-dimensional image. The top and bottom portions of foreground objects are then monitored to determine whether or not the bottoms of the objects overlap with the tripwire. When this occurs, these tripwire events are recorded.

Such video analytic systems provide capabilities such as logging when people or other objects cross the tripwire. Often such systems will maintain statistics concerning the probability the individual in fact crossed the tripwire, and the systems may even take and send a snapshot of the video when such an event is detected.

Other video analytic systems have been proposed for specifically monitoring doorways. Individuals are tracked as to how they interact with a zone around a door. Loitering around the door is noted as possible security breaches, depending on how alerts are configured. Often, these systems are concerned with detecting "tailgating" in which a second person tries to pass through a secure zone by walking with another person. The proposed systems monitor the serial actions of individuals then make conclusions concerning the individuals' actions.

SUMMARY OF THE INVENTION

The present invention concerns a video analytics system that can detect subjects when they are entering and/or exiting from an area being monitored, such as a room. The system enables a user to define a portal, such as doorway of the area being monitored, e.g., room. The system then monitors the movement of foreground objects in the area being monitored. Objects that appear only in the portal are classified as passing by the portal, e.g., doorway. Objects that initially appear in the portal and then are detected moving within the area being monitored are classified as having entered the area being monitored via the portal. Objects that are in the area being monitored and then disappear within the portal are classified as having exited the area being monitored via the portal. The system further has provisions for generating real-time alerts and performing forensic searches.

In operation, the portal is defined and a video analysis system initially determines the background of a camera view and then proceeds to monitor foreground objects. It determines whether foreground objects have entered or exited the area being monitored and then generates alerts to the user. Alternatively, system can provide the user with a forensic search capability in which the portal is defined and then previously captured video is searched to determine whether or not foreground objects had previously entered or exited the area being monitored via the portal.

In general, according to one aspect, the invention features a method for monitoring a portal in a video analytic system. The method comprises enabling definition of an area of a background model as a portal, and then monitoring movement of foreground objects against the background model. Foreground objects that first appear within the portal and then move out of the portal are classified as entering the area being monitored via the portal.

In embodiments, the system enables the definition of the portal by an operator using a graphical user interface to identify portal within the scene.

Alternatively, the definition of the portal is performed automatically by the system by analyzing video data to identify portals through which foreground objects enter and exit area being monitored.

Generally, movement of the foreground objects is tracked between frames of the video data and vectors generated indicating movement of the foreground objects. This information is preferably stored as metadata.

When the foreground objects first appear within the portal and then disappear within the portal, they are classified as passing by the portal. Corresponding metadata are generated but the objects are not classified as having entered the area being monitored unless they appear in the scene but outside the area of the portal.

In general, according to another aspect, the invention features method for monitoring a portal in a video analytic system. This method also comprises enabling definition of an area of a background model as a portal and then monitoring movement of foreground objects against the background model. Foreground objects are classified as exiting the area being monitored when they pass into the portal and then disappear within the portal.

In general, according to another aspect, the invention can be characterized as a video monitoring and analytic system. This system comprises at least one video camera generating video data of a scene and a video data and metadata archive that stores the video data from the at least one video camera.

A video analysis system analyzes video data from the at least one video camera. It provides for the definition of an area of a background model of the scene of an area being monitored as a portal and then monitors movement of foreground objects against the background model. Metadata are generated and stored with the video data indicating that the foreground objects have entered the area being monitored when the foreground objects first appear within the portal and then move out of the portal and remain in the scene.

In another example, the video analysis system generates metadata that the foreground objects have exited the area being monitored when the foreground objects pass into the portal and then disappear while in the portal.

The system then further provides for real-time alerts and forensic searches. In more detail, with the metadata stored in the video data and metadata archive, real-time alerts can be generated based upon or triggered by individuals entering or leaving the area being monitored, such as a room being monitored by the system. Further, with the metadata stored in the archive, the system enables later forensic searches to identify when individuals entered or left the area being monitored. Further, the corresponding video data are accessed to allow the operator to identify those individuals and possibly take further action.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
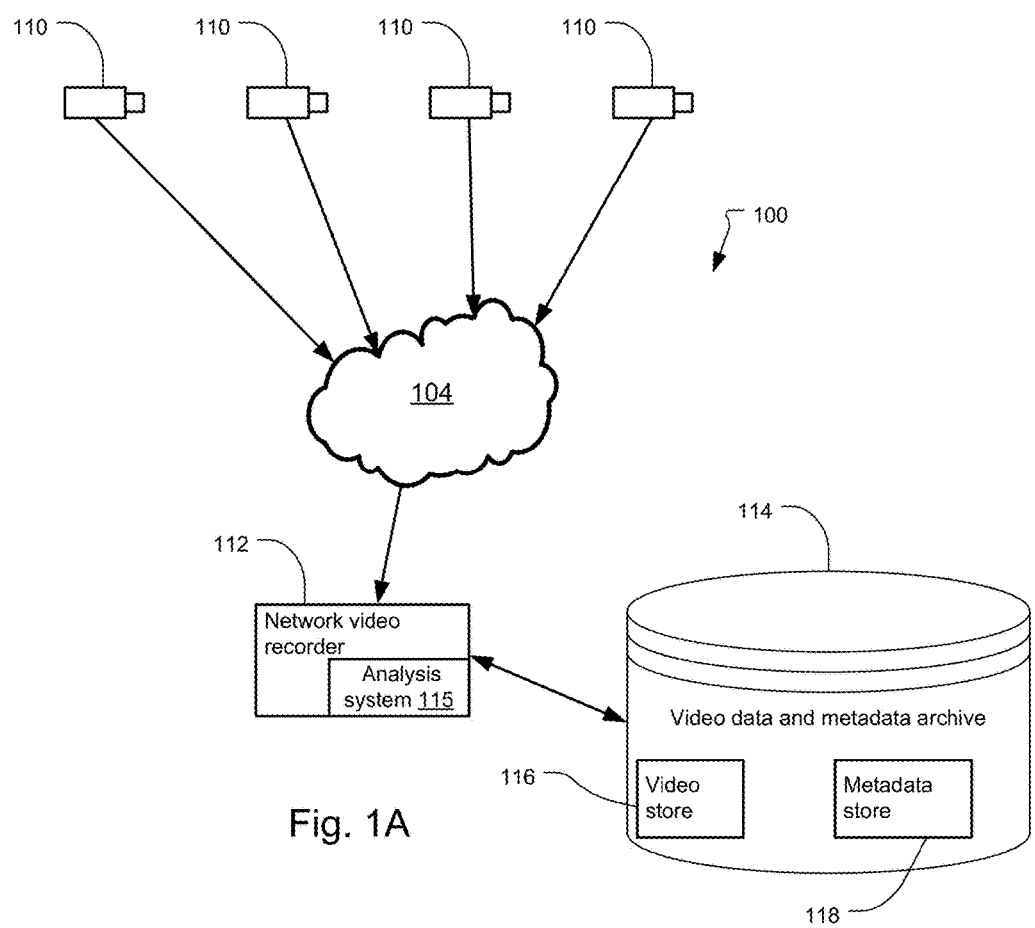
FIG. 1A is a block diagram showing a network video analytic system to which the present invention relates.

FIGS. 1A, B, and C illustrate the architecture of video recording and analysis systems 100 to which the present invention is relevant.

The video recording and analysis system 100 generally comprises a number of video cameras 110. The current system can handle and process the video data feeds from up to 128 separate video cameras 110.

These video cameras 110 are connected to a network video recorder 112 via a network 104. The network 104 can be a private network, such as the local area network provided in a building. In other embodiments, the network 104 can include a combination of private networks and even public networks so that the video feeds from the video cameras 110 can be transmitted to the network video recorder system 112 enabling the recording and analysis of video in remote locations.

The network video recorder 112 stores the video data and any metadata in a video data and metadata archive 114. Generally, this data archive 114 includes both a video store 116 that includes the raw video data from the cameras 110 and a metadata store 118 that includes metadata that are generated for the associated video.

The video data generated by the cameras 110 is analyzed by an analysis system 115. This analysis system generates the metadata from the video data, which metadata are stored in the metadata store 118 in the video data and metadata archive 114.

There are a number of different places that the analysis system 115 can be deployed in the video recording and analysis system 100. These different approaches are illustrated in each of the FIGS. 1A, 1B, and 1C.

As illustrated in FIG. 1A, in one example, the analysis system 115 is implemented with the network video recorder 112. In this example, the video data from the video cameras 110 are received over the network 104 at the video recorder 112. The analysis system 115 can be either a process that runs on the network video recorder 112 or a separate system that is deployed on an interface to the network video recorder system 112.

Figure 1B:
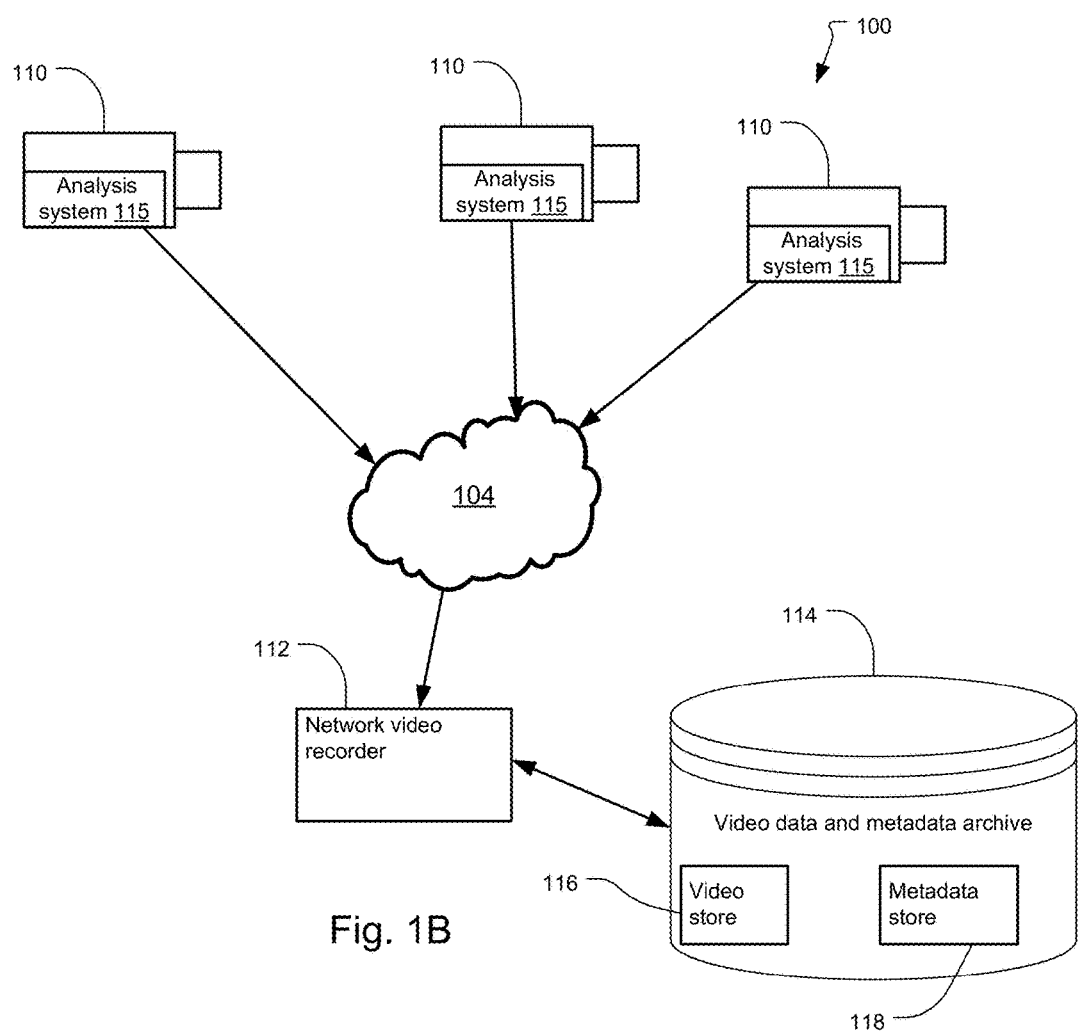
FIG. 1B is a block diagram showing a network video analytic system with another architecture to which the present invention also relates.

As illustrated in FIG. 1B, in another example, the analysis system 115 is part of each of separate video cameras 110. Here, the metadata are generated locally at each of the video cameras 110. The video data with the metadata are then transmitted over the network 104 to the network video recorder 112, which then stores the video data and the metadata in the archive 114.

Figure 1C:
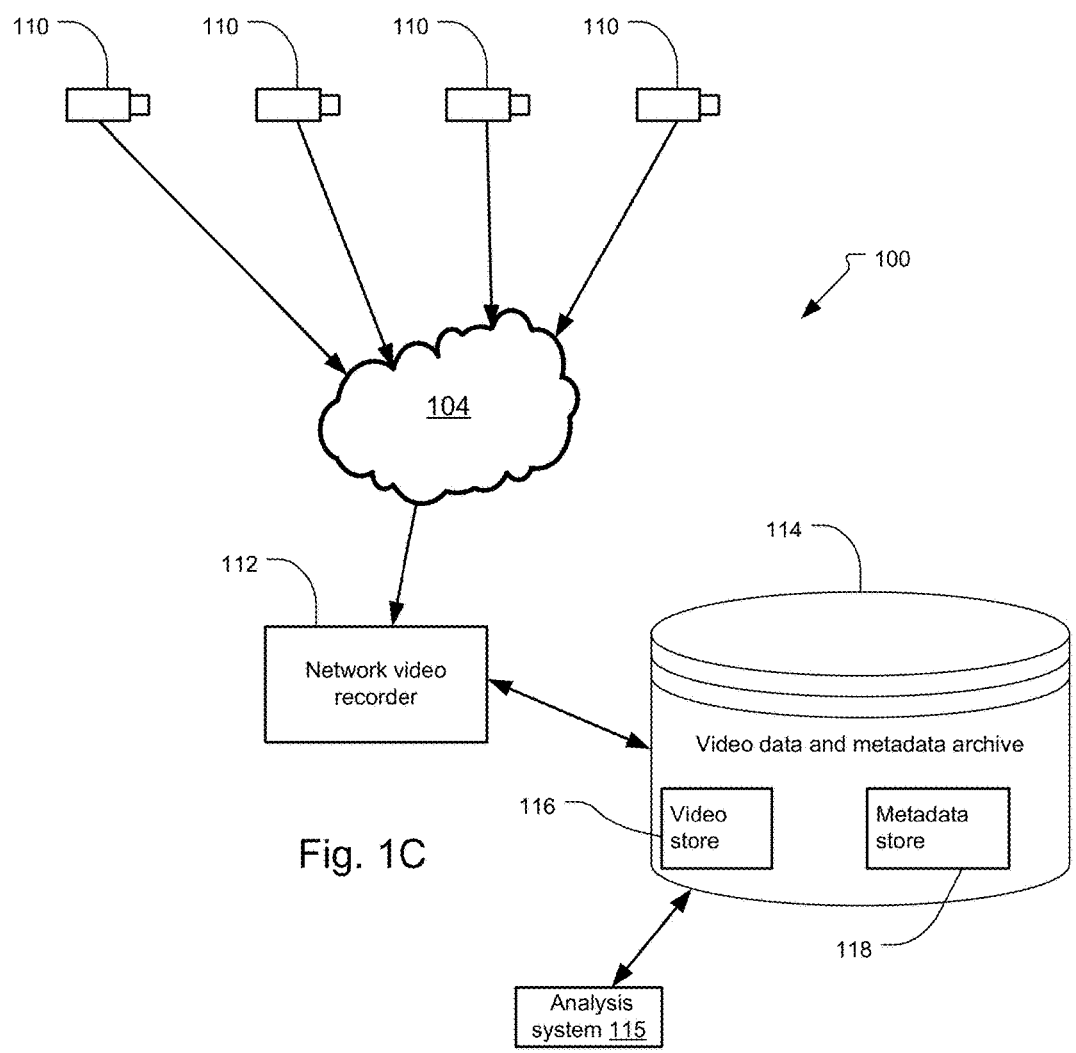
FIG. 1C is a block diagram showing a network video analytic system with still another architecture to which the present invention also relates.

FIG. 1C illustrates still another example. Here, the analysis system 115 is a separate system that processes video data preferably by accessing the video data in the video data and metadata archive 114. In this example, the video data generated by each of the cameras 110 is stored to the archive 114 by the network video recorder 112. Then, the analysis system 115 accesses that video data from the archive 114 generates the metadata and then stores the metadata back into the metadata store 118 of the archive 114.

In some examples, all of the video data generated by the video cameras 110 are stored in the video store 116. In other examples, video data are only stored when the analysis system 115, upon analyzing that video, decides that an event of interest, for example, has occurred and that the video should then be stored.

The video data stored in the video store 116 and the associated metadata stored in the metadata store 118 is correlated to each other via timestamps stored with the metadata that correlate to the video data from the particular video camera 110 and the event detected in the video data that gave rise to the metadata 118.

Figure 2:
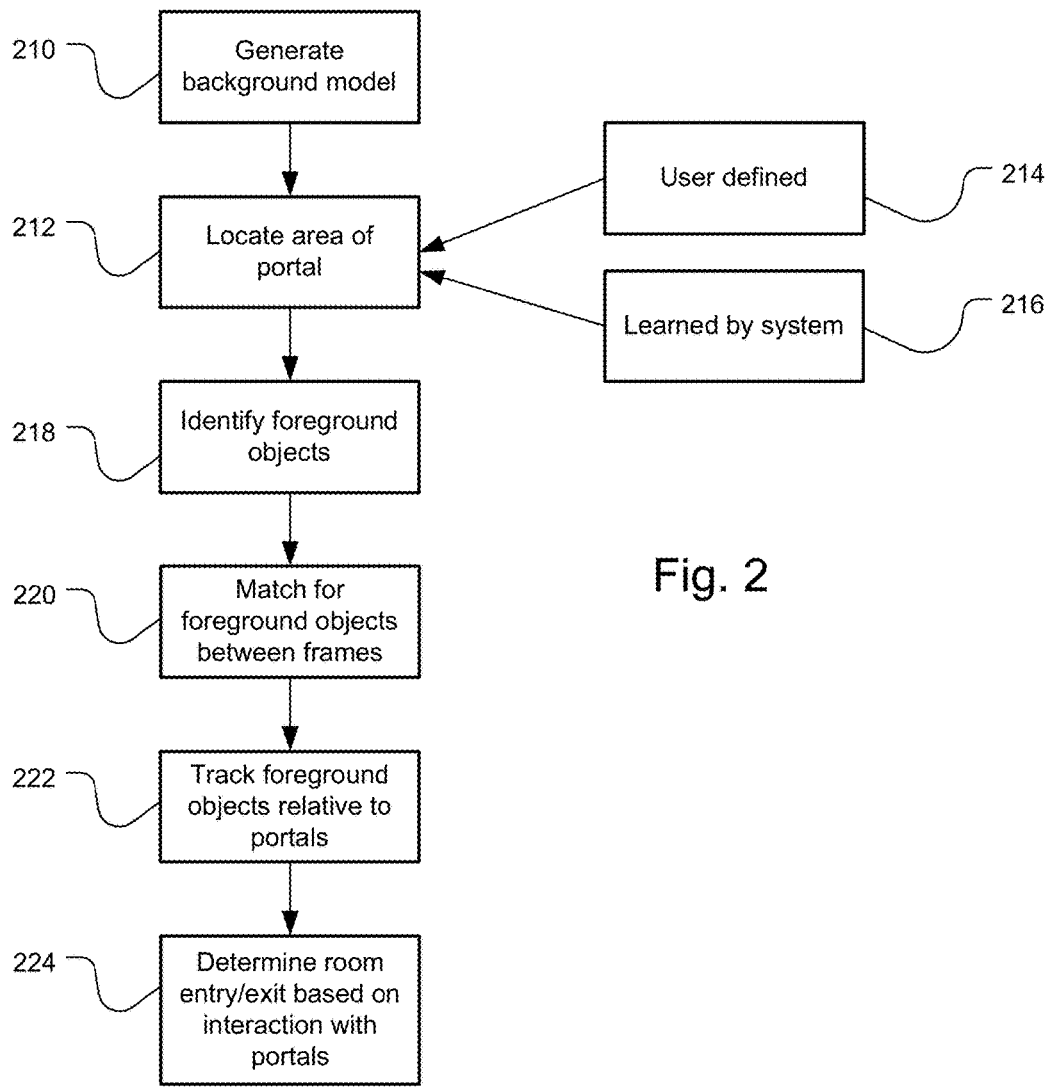
FIG. 2 is a flow diagram illustrating the processing of video data to enable the tracking of objects within the scene captured in the video data.

FIG. 2 illustrates how the video data from each of the video cameras 110 is analyzed by the analysis system 115.

The network video analysis system 112 first analyzes the video data from each of the video cameras 110 to generate a background model for the scenes that are being observed by each of the video cameras of the respective areas being monitored. The background model represents the stationary portion of the scene that is being monitored by each video camera. This is the portion of the scene that does not change from frame to frame. Each pixel in the captured scene is averaged over time in order to generate an image of the scene, for example a room, that contains only the portions of the scene that do not change or change only very slowly.

With respect to the generated background model, any portals, for example doorways, in the scene from the area being monitored are identified in step 212.

In one implementation, portals are identified by an operator in step 214 that observes the scene and then using a graphical user interface of the analysis system 115 identifies a two dimensional area within the scene's two dimensional image that represents a portal. This is an area of the scene through which objects, such as individuals, can enter and leave the area being monitored, such as a room.

In another implementation, the analysis system 115 automatically identifies these portals in step 216. This is accomplished by analyzing the video data from the scene over time to determine regions in the scene that represent portals through which individuals or other objects can enter or leave the area being monitored.

Next, during operation, the analysis system 115 monitors successive frames of the video data from each of the cameras to identify foreground objects. Foreground objects are identified by comparing the current video data to the background model. Generally, foreground objects are regions of the scene where it differs from the background model, although in some instances, if these foreground objects are stationary for long periods in the video data, then they will become part of the background model and lose their status as a foreground object.

The video data are then analyzed between successive frames in step 220. This is performed in order to track how the foreground objects move within the scene. In this way, individuals can be tracked over time as they move within the scene. Preferably, the foreground objects are identified with bounding boxes and stored as metadata as they move within a scene. Vectors characterizing the movement of the foreground objects through the scene are preferably further stored with the video data as metadata.

In step 222, these foreground objects are further tracked relative to portals, such as doorways, in the area being monitored. In this way, their interaction with portals is used to determine whether or not the foreground objects, e.g., individuals, have entered or left the area being monitored, for example. Based on this analysis, in step 224, metadata is further stored with the video data as these foreground objects enter and leave the scene so that their movements are recorded and are accessed for later analysis. In other examples, alerts are generated in real time so that alerts can be generated to security personnel, for example, in the case where an unauthorized individual has entered a secure area being monitored by the video cameras 110.

Figure 3:
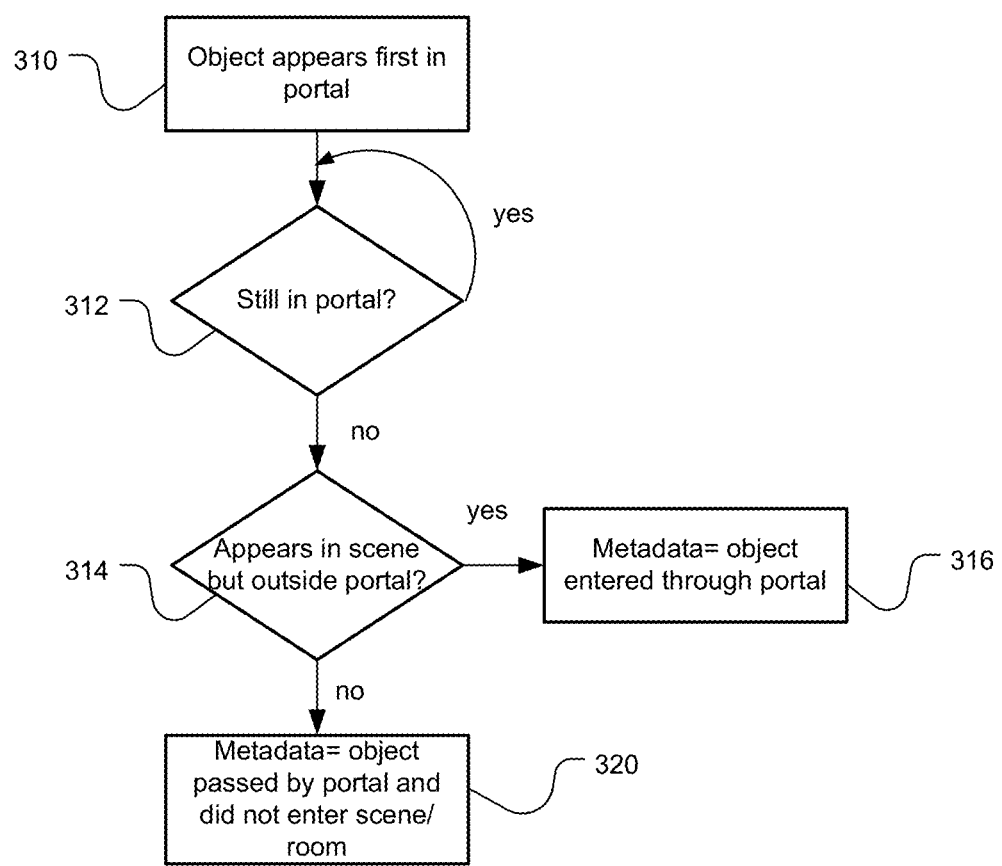
FIG. 3 flow diagram illustrating the monitoring of a portal and the generation of metadata when objects enter an area of interest via the portal.

FIG. 3 illustrates how the analysis system 115 determines that a foreground object, such as an individual, has entered the scene being monitored, a room for example.

In step 310, the analysis system 115 monitors the scene and specifically the video data from the video cameras 110 for foreground objects that first appear in the portal, such as a doorway.

Figure 4A:
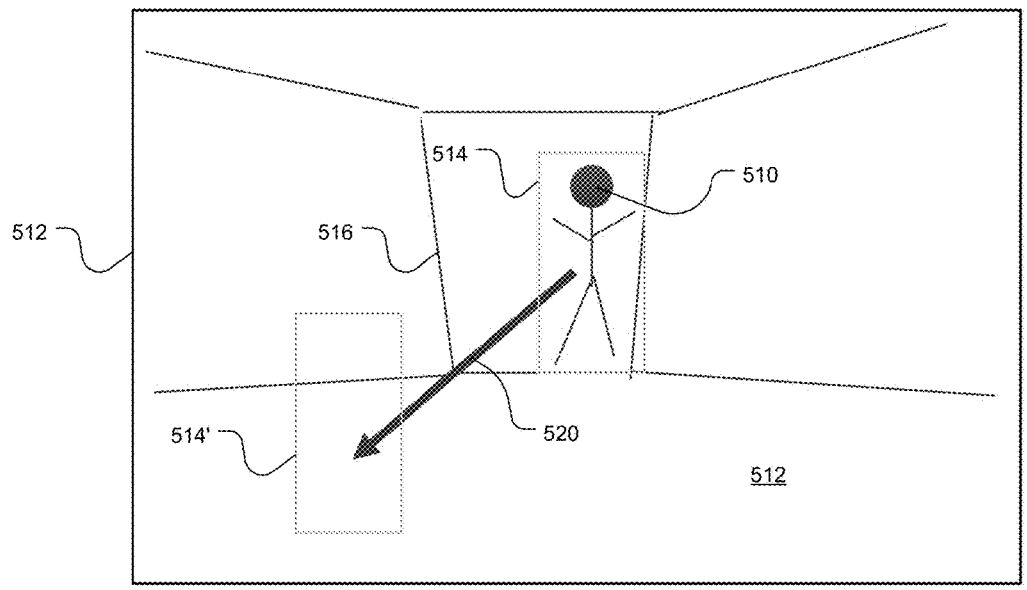
FIGS. 4A, 4B, and 4C are schematic diagrams showing how the system tracks foreground objects and analyzes their movement to conclude whether the foreground objects have entered a area of interest, such as a room.

This entry determination is illustrated with respect to FIG. 4A. In this example, the scene 512 is contained in the video data from a video camera 110 that is located in an area being monitored, such as a room. Within the scene, a portal or doorway 516 is defined. In the illustrated example, this portal 516 is a generally rectangle or other two dimensional area of the scene 512. An individual 510 constitutes a foreground object. The analysis system 115 tracks this individual by drawing a bounding box 514 around the individual. In this example, the foreground object box 514 has first appeared within the area of the portal 516.

Returning to FIG. 3, in step 312, the analysis system 115 monitors the foreground object 514 to determine whether or not it has stayed within the portal 516. So long as it stays entirely within the portal, the analysis system 115 continues to track the foreground object 514 but does not conclude that it has entered the area being monitored, such as the room.

In step 314, it also checks to determine whether the foreground object 514 appears in the scene but outside the portal 516.

If it has disappeared within the portal, then it is likely that the foreground object 514 has simply passed by the doorway and has not entered the area being monitored.

Figure 4B:
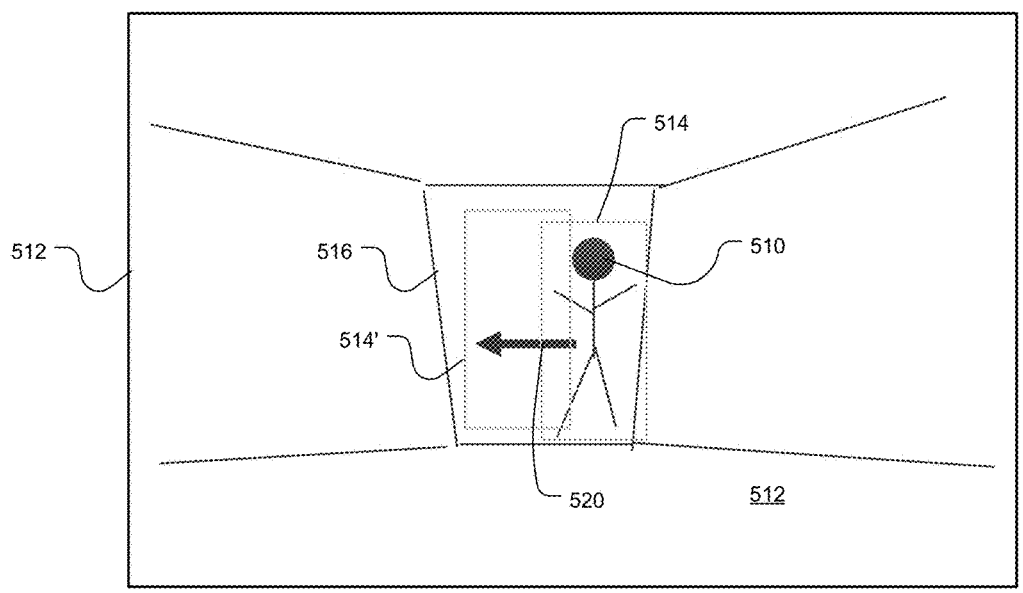

This scenario is illustrated in FIG. 4B. In this example, the foreground object 514 in one frame moves to position 514' in a subsequent frame. The analysis system 115 monitors the movement of this foreground object 514 between these frames and generates a vector 520 that represents the movement of the foreground object 514, in this example the individual 510, between successive frames and over time. If the individual continues on this path indicated by vector 520, then it will pass out of the scene, but did not enter the area being monitored. In this way, the metadata generated by the analysis system 115 and stored in the metadata store 118 in association with this video data will simply be that an individual passed by portal 516.

Figure 4C:
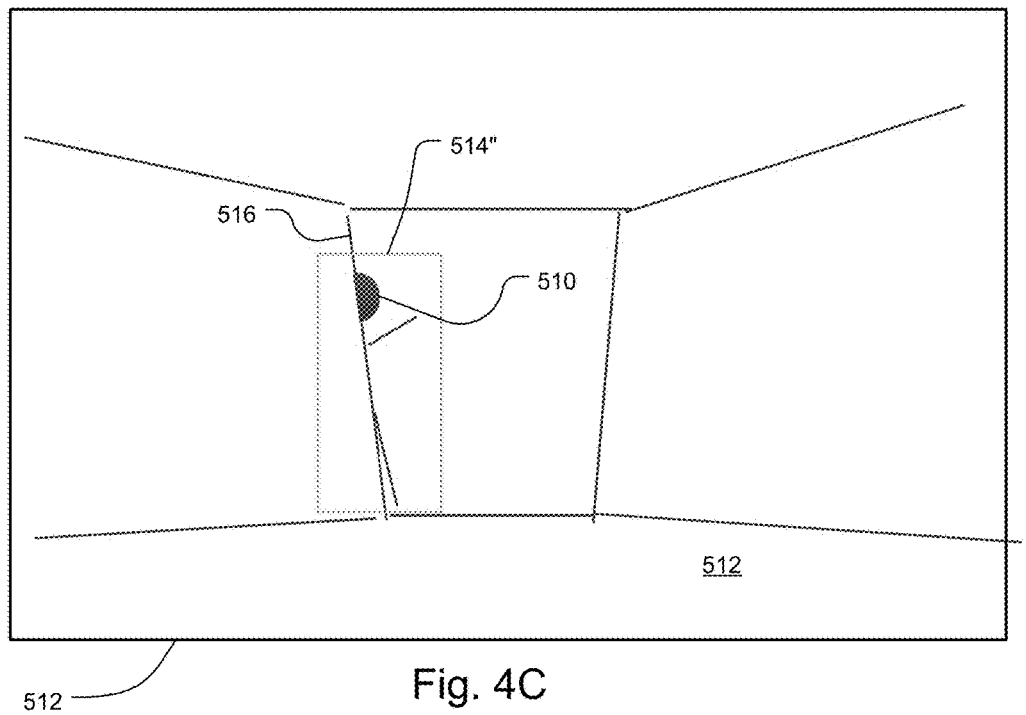

Said another way, so long as no part of the foreground object 514 is ever outside the portal, the analysis system concludes that the foreground object has merely passed-by the portal and has not entered the area being monitored. This situation is illustrated in FIG. 4C showing the foreground object 514" continuing to pass by the portal 516 such that part of the individual's body 510 is obscured by the portal 516, on one hand, yet no part of the individual's body 510 is ever outside the area if portal 516, on the other.

Returning to FIG. 3, when the analysis system 115 concludes that the foreground object 514 has disappeared within the portal 516, then the analysis system 115 generates metadata for this video data that a foreground object has passed by the portal in step 320.

The analysis system 115 also monitors whether the foreground object 514 appears within the scene but outside the portal. This scenario is illustrated in FIG. 4A. In an earlier frame, the individual is identified as foreground object 514. But then in a later frame, the foreground object is determined to be at position 514'. The analysis system 115 generates a vector 520 and stores this vector with the metadata of the video data to represent the movement of the foreground object 514 between successive frames and thus its movement over time.

This movement, in the illustrated example, is further recorded as a foreground object 514 or individual 510 as entering the area being monitored. In this instance, the foreground object is first identified within the portal 516 and then located in this scene but outside the portal at a later point in time, see 514' of FIG. 4A. It is thus determined to have entered the monitored area via this portal.

As a general rule, if any part of the foreground object 514 is ever outside the portal, then the object is classified has having entered the area being monitored. As a result, the situation of an object moving directly towards the camera is addressed since while some part of the object is within the portal, at least part of it is outside the portal at some point.

Returning to FIG. 3, in this instance, the analysis system 115 generates metadata in conjunction with the video data in step 316 to note that the foreground object 514 has entered the room.

Figure 5:
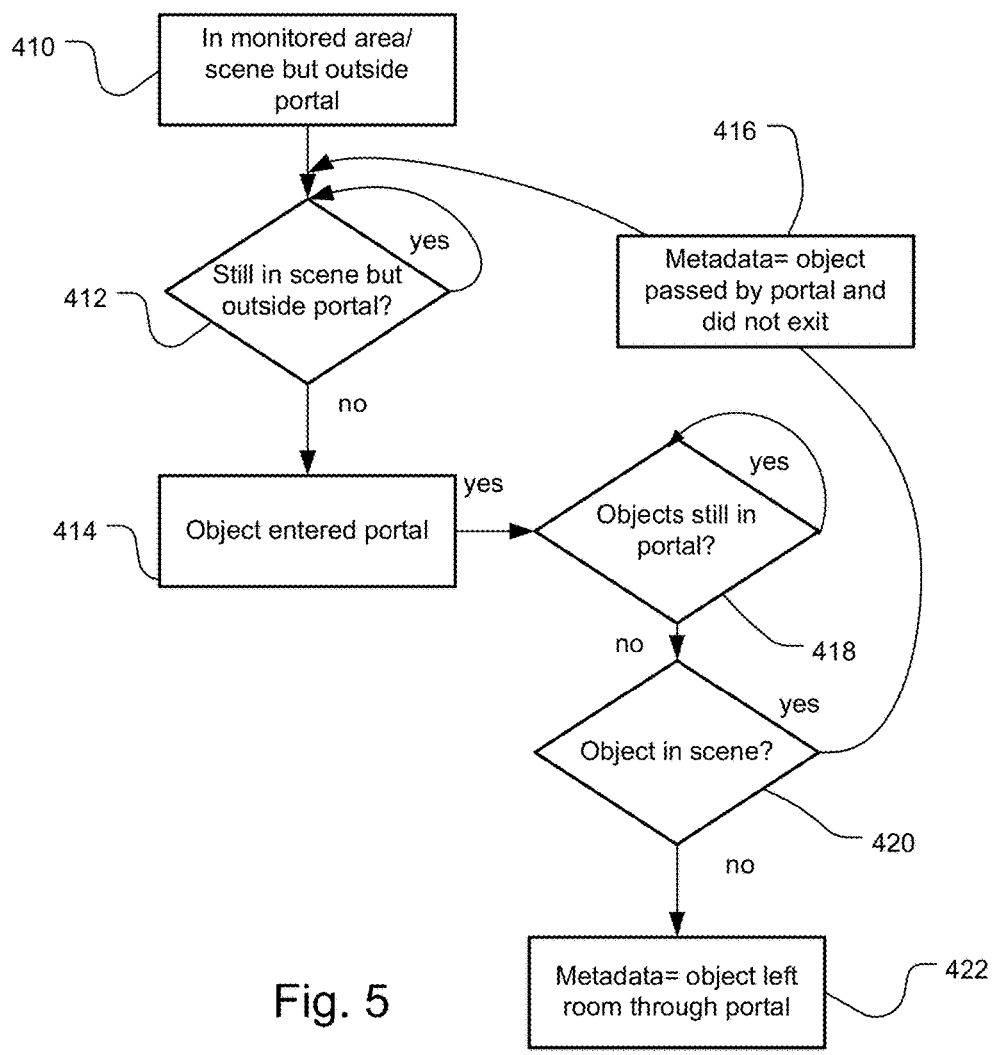
FIG. 5 flow diagram illustrating the monitoring of a portal and the generation of metadata when objects exit the area of interest via the portal.

FIG. 5 illustrates the process by which the analysis system 115 concludes that a foreground object, such as an individual, has left the area of interest, such as a room 512.

In step 410, the analysis system 115 tracks foreground objects 514 that are within the room 512 but not entirely within the portal 516. These foreground objects are recorded and metadata are stored to the video data and metadata archive 114 to indicate that the foreground objects, such as individuals, are currently within the room 512 in step 412. As the foreground objects move within the room, their position is tracked and corresponding vectors indicating their movement are stored as metadata to the metadata store 118.

Figure 6A:
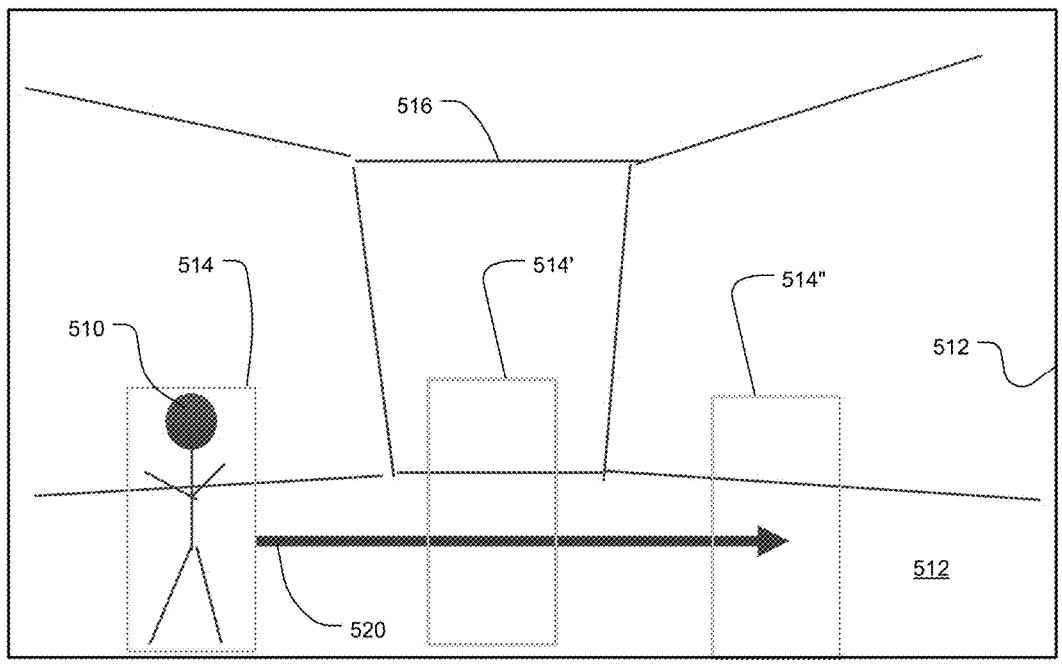
FIGS. 6A and 6B are schematic diagrams showing how the system tracks foreground objects and analyzes their movement to conclude whether the foreground object have exited the area of interest, such as a room.

This is illustrated in FIG. 6A. Here, the foreground object moves from position 514 to 514' to 514" over time. The vector 520 is generated and stored as metadata to indicate the foreground object's movement within the room 512.

Returning to FIG. 5, the foreground objects are also monitored to determine whether they enter the area of the portal 516, in step 414. When the analysis system 115 determines that they have entered the portal in step 414, the analysis system 115 then monitors the foreground objects to determine whether they stay within the portal 516, or not, in step 418.

If they merely pass by the portal, as illustrated in FIG. 6A, then the objects 514 are determined to have entered the area of the portal, see 514', then to have left the area of the portal, see 514", but are still detected within the scene as determined in step 420. In this case, metadata are generated in step 416 that the foreground object passed by the portal 516.

Figure 6B:
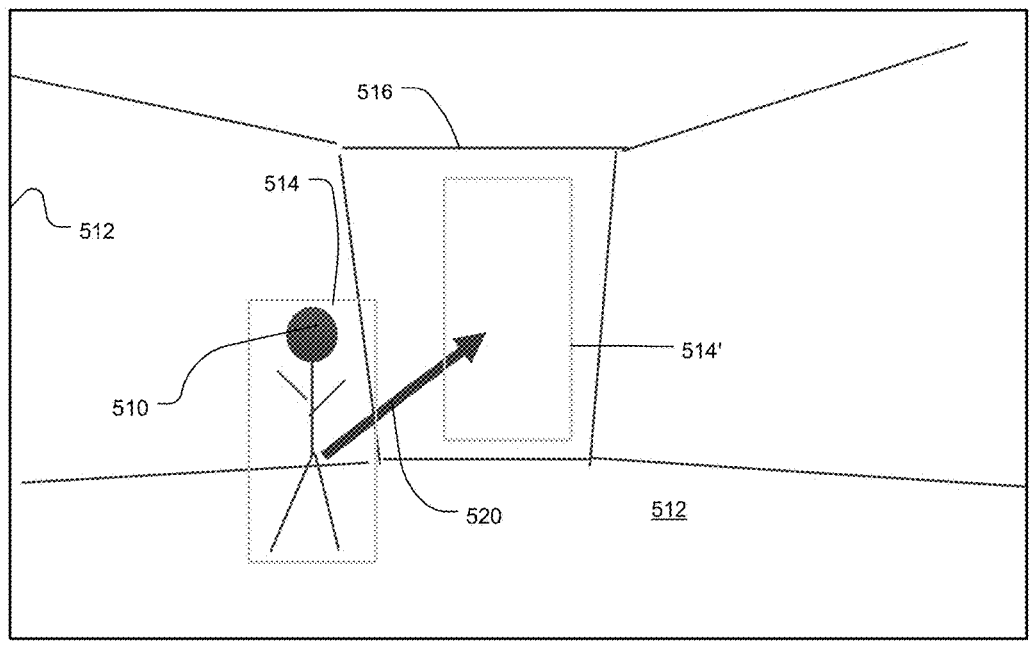

The situation in which the foreground object disappears within the portal 516 is illustrated in FIG. 6B. Here the foreground object 514 moves from the room to the area of the portal as indicated by position 514'. In this position, the foreground object 514' is within the portal 516.

Returning to FIG. 5, if the foreground object is determined to no longer be in the portal in step 418 and has further disappeared from the scene as determined in step 420 without having exited from the portal and back into other parts of the scene, then the analysis system 115 concludes that the individual 510 has left the room 512 via the portal 516.

In step 422, metadata are generated indicating that the foreground object 514 left the area of interest via the portal and this metadata are stored to the metadata store 118 along with the corresponding video, which is stored in the video store 116.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for monitoring a portal of an area being monitored with a video analysis system, comprising:
    enabling definition of a portal area of a background model of a scene as a portal, the portal area being a rectangular or other two dimensional area surrounded and within a remainder of the scene;
    monitoring movement of foreground objects against the background model; and
    classifying foreground objects in the scene that pass into the portal area and then disappear within the portal area as exiting the area being monitored.

2. A method as claimed in claim 1, wherein enabling the definition of the portal comprises using a graphical user interface to identify the portal area within the scene.

3. A method as claimed in claim 1, wherein enabling the definition of the portal comprises analyzing video data to identify portals through which foreground objects enter and exit the area being monitored.

4. A method as claimed in claim 1, wherein monitoring movement of the foreground objects comprises tracking the foreground objects between frames of the video data and generating vectors indicating movement of the foreground objects.

5. A method as claimed in claim 1, further comprising classifying the foreground objects that pass into the portal area and then out of the portal area but remain within the scene as moving within the area being monitored.

6. A method as claimed in claim 1, wherein the foreground objects are classified as having exited the area being monitored when the foreground objects are present in the scene and then pass into the portal area and then disappear within the portal area and from the scene.

7. A method as claimed in claim 1, wherein classifying the foreground objects further comprises:
    tracking the foreground objects within the scene that then enter the portal area and then disappear within the portal area to classify the foreground objects as having exited the area being monitored;
    generating metadata indicating that the foreground objects have exited the area being monitored in response to the classification; and
    storing the metadata to a video data and metadata archive.

8. A method as claimed in claim 1, further comprising generating alerts over a network that are triggered when the foreground objects are classified as having exited the area being monitored.

9. A video monitoring and analysis system comprising:
    at least one video camera generating video data of a scene of an area being monitored;
    a video data and metadata archive that stores the video data from the at least one video camera; and
    a video analysis system that receives video data from the at least one video camera and analyzes the video data, the video analysis system enabling definition of a portal area of a background model of the scene as a portal, the portal area being a rectangular or other two dimensional area surrounded and within a remainder of the scene, and then monitoring movement of foreground objects against the background model, and generating and storing metadata to the video data and metadata archive indicating that the foreground objects have exited the area being monitored when the foreground objects pass into the portal area and then disappear while in the portal area.

10. A system as claimed in claim 9, wherein the video analysis system enables the definition of the portal using a graphical user interface to identify the portal area within the area being monitored.

11. A system as claimed in claim 9, wherein the video analysis system analyzes video data from the at least one video camera to identify portals through which foreground objects enter and exit the area being monitored.

12. A system as claimed in claim 9, wherein the video analysis system tracks the foreground objects between frames of the video data and generates vectors indicating movement of the foreground objects in the scene.

13. A system as claimed in claim 9, wherein the video analysis system classifies the foreground objects that first appear within the portal area and then disappear within the portal area as passing by the portal.

14. A system as claimed in claim 13, wherein the video analysis system generates metadata indicating that the foreground objects have passed by the portal.

15. A system as claimed in claim 9, wherein the video analysis system generates metadata indicating that the foreground objects have exited the area being monitored when the foreground objects are present in the scene and then pass into the portal area and then disappear within the portal area and from the scene and the foreground objects are classified as having entered the area being monitored if part of the foreground object is within the portal area and part is outside the portal area.

16. A system as claimed in claim 9, wherein the video analysis system generates alerts over a network that are triggered by the metadata indicating the foreground objects have exited the area being monitored.

17. A method for monitoring a portal of an area being monitored with a video analysis system, comprising:
  enabling definition of a portal area of a background model of a scene as a portal, the portal area being a rectangular or other two dimensional area surrounded and within a remainder of the scene;
  monitoring movement of foreground objects against the background model;
  tracking foreground objects that first appear within the portal area, and then, in response to determining that the foreground objects are located within the scene but have moved outside the portal area, classifying the foreground objects as having entered the area being monitored and generating metadata indicating that the foreground objects have entered the area being monitored in response to the classification;
  tracking the foreground objects that are within the scene and that later enter the portal area and then disappear within the portal area and classifying those foreground objects as having exited the area being monitored and generating metadata indicating that the foreground objects have exited the area being monitored in response to the classification; and
  storing the metadata to a video data and metadata archive.

* * * * *